United States Patent
Schneider et al.

(10) Patent No.: US 8,348,557 B2
(45) Date of Patent: Jan. 8, 2013

(54) CUTTING HEAD FOR A MILLING MACHINE FOR MANUFACTURING OPHTHALMIC LENSES MADE OF PLASTIC

(75) Inventors: Gunter Schneider, Marburg (DE); Helwig Buchenauer, Dautphetal-Buchenau (DE); Klaus Krämer, Dautphetal-Friedensdorf (DE)

(73) Assignee: Schneider GmbH & Co. KG, Fronhausen (DE)

( * ) Notice: Subject to any disclaimer, the term of this patent is extended or adjusted under 35 U.S.C. 154(b) by 456 days.

(21) Appl. No.: 12/660,772

(22) Filed: Mar. 4, 2010

(65) Prior Publication Data
US 2010/0226729 A1    Sep. 9, 2010

(30) Foreign Application Priority Data
Mar. 4, 2009   (DE) .................. 10 2009 011 195

(51) Int. Cl.
*B23C 5/26* (2006.01)
*B23C 5/12* (2006.01)

(52) U.S. Cl. .......................................... 407/56; 407/53
(58) Field of Classification Search .................... 407/56, 407/53, 58, 61; 409/231, 232, 234, 64, 73
See application file for complete search history.

(56) References Cited

U.S. PATENT DOCUMENTS

| | | | | |
|---|---|---|---|---|
| 1,327,101 A | * | 1/1920 | Kellogg | 76/115 |
| 1,761,755 A | * | 6/1930 | Smith | 76/115 |
| 2,557,751 A | * | 6/1951 | Melzer | 407/53 |
| 3,283,663 A | * | 11/1966 | Davis | 409/181 |
| 3,289,717 A | * | 12/1966 | Dutot | 144/134.1 |
| 6,056,485 A | * | 5/2000 | Magill et al. | 407/54 |
| 8,038,370 B2 | * | 10/2011 | Sjoo | 407/29 |

FOREIGN PATENT DOCUMENTS

| | | |
|---|---|---|
| DE | 20205995 U1 | 7/2002 |
| DE | 20215460 U1 | 1/2003 |
| DE | 101 43 848 C2 | 3/2003 |
| DE | 10 2006 007 204 B4 | 1/2009 |

OTHER PUBLICATIONS

Sandvik Coromant: "Rotating Tools Catalogue" Feb. 2001, AB Sandvik Coromant, Sweden, pp. A60, A62, A152 and E28.

* cited by examiner

*Primary Examiner* — Will Fridie, Jr.
(74) *Attorney, Agent, or Firm* — Hudak, Shunk & Farine Co. LPA

(57) ABSTRACT

A milling head for a milling machine for producing synthetic spectacle lenses, comprising a rotational axis, a coupling part for tensioning into a milling spindle chuck, a shoulder which connects to the coupling part with a contact surface for the milling spindle chuck, a shaft which is connected to the shoulder and a blade collar with an outer diameter D which is connected to the shaft and which comprises several cutting plates with a radius R, wherein between the blade collar at the height of the outer diameter D and the contact surface, a free length L is provided. The measurement of the free length L in relation to the measurement of the outer diameter D and the measurement of the radius R fulfills the following condition: $|L|=0.18 \,(|D|-2|R|)+54\pm a$, with a maximum deviation a of 3.

20 Claims, 2 Drawing Sheets

CUTTING HEAD FOR A MILLING MACHINE FOR MANUFACTURING OPHTHALMIC LENSES MADE OF PLASTIC

FIELD OF THE INVENTION

The invention relates to a milling head for a milling machine for producing synthetic spectacle lenses, comprising a rotational axis, a coupling part for tensioning in a milling spindle chuck, a shoulder with an axial contact surface for the milling spindle chuck, a shaft which is connected to the shoulder and a blade collar with an outer diameter D which is connected to the shaft which comprises several cutting plates with a radius R, wherein between the blade collar at the height of the outer diameter D and the contact surface, a free length L is provided. The maximum diameter of the milling head or blade collar is designated as the outer diameter D.

In relation to the direction of the rotational axis, the distance between the contact surface of the coupling part which can be laid onto the milling spindle chuck in the axial direction and the blade collar is designated as the free length L, wherein on the blade collar, the position on the outer diameter D is decisive.

BACKGROUND OF THE INVENTION

A wide range of different types of milling heads for cutting spectacle lenses is known from the prior art. The known milling heads usually have between five and ten blades depending on the diameter. More blades cannot be realized without difficulty, since half the diameter or radius of the milling head must be smaller than the radius of the spectacle lens to be produced. Accordingly, the space available on the circumference of the milling head is limited.

DE 10 2006 007 204 B4 describes a tool for the chip removing machining of materials in optical production with a middle axis M with at least one geometrically defined milling blade and with at least one defined rotary blade, past which the workpiece to be machined is moved, wherein a reference plane is given which comprises a longitudinal axis which cuts the middle axis M of the tool which incorporates with the middle axis M an angle a and a transverse axis which cuts the longitudinal axis below an angle of 90°.

According to DE 101 43 848 C2, a tool for the surface machining of work pieces made of non-brittle hardened materials is known in optical production which comprises a basic body in which a plurality of milling blades is provided, and which define the milling blades by a rotation of the tool around a tool rotation axis in a plane vertical to the tool rotation axis in a fly circle, wherein on the basic body, at least one rotary blade is also provided which is arranged opposite the fly circle of the milling blades, offset radially inwards by a pre-defined amount.

SUMMARY OF THE INVENTION

The object of the invention is to design and arrange a milling head in such a manner that the vibration behaviour during operation guarantees a highly precise machining of spectacle lenses.

The object is attained according to the invention by means of the features described in the claims. When producing spectacle lenses, milling heads are used which can be operated with a torque of approximately 25000 rpm. Since the torque and the number of blades have a direct influence on the excitation frequency during machining, an optimum and adapted design of the geometry of the milling head is necessary. Due to the fact that the measurement of the free length L in relation to the measurement of the outer diameter D and the measurement of the radius R fulfils the condition $|L|=0.18 (|D|-2|R|)+54\pm a$ with a maximum deviation a of 3, 2, 1 or 0.5, negative influences from the excitation frequency are at least partially suppressed or offset. Thus, the production of high-precision spectacle lenses is possible.

The length L, the outer diameter D and the radius R of the cutting plate comprise the unit [mm]. The amount of these variables is without dimension and designates the numeric value of the respective measurement or the distance between the respective numeric value and zero.

For this purpose, it can also be advantageous when the shaft has a length l which is at least 50% of the length L, a diameter d between 10 mm and 32 mm or a maximum of 16 mm or 26 mm. Thus, the machining of spectacle lenses is possible with a low curve radius despite the optimisation of the vibration behaviour.

Furthermore, it can be advantageous when the length l is between 80% and 120%, or 100%, of the outer diameter D. A lesser length l would be advantageous for the vibration behaviour. However, in this case, the variants of the lens forms to be produced would be limited.

It can also be advantageous when the blade collar has twelve cutting plates over its circumference U. The excitation of the vibration is for example dependent on the number of blades. The number of blades given above has a positive effect on the vibration behaviour of the milling head.

BRIEF DESCRIPTION OF THE DRAWINGS

Further advantages and details of the invention are explained in the patent claims and in the description, and are shown in the figures, in which:

DETAILED DESCRIPTION OF THE INVENTION

Figure 1:
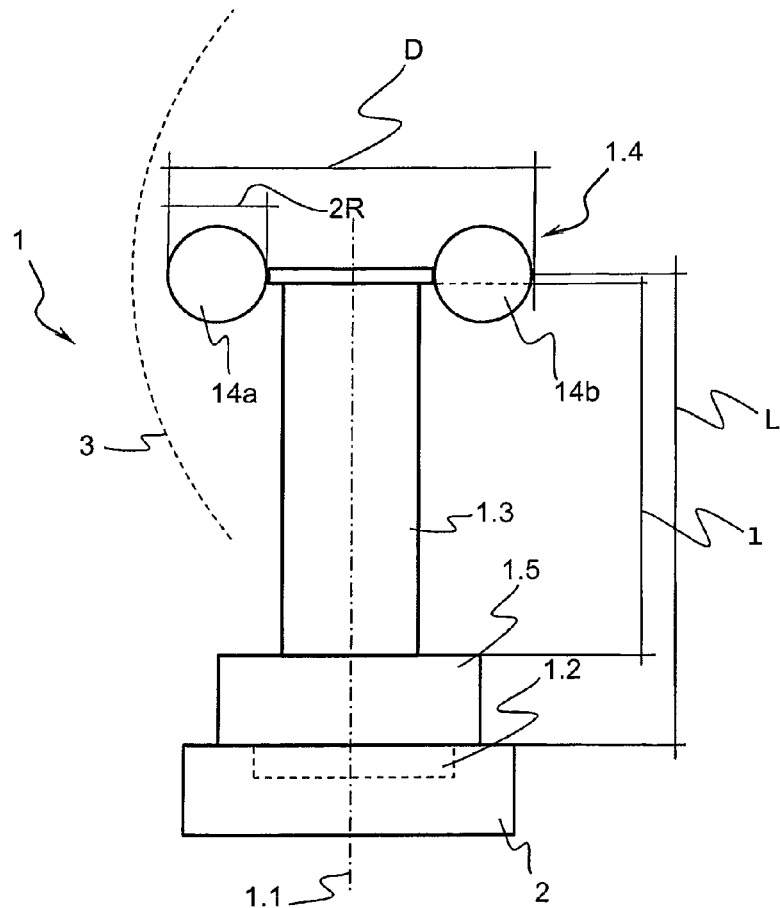
FIG. 1 shows a schematic diagram of a milling head with spectacle lens.

According to the schematic diagram shown in FIG. 1, a milling head 1 for a milling machine for producing synthetic spectacle lenses comprises a rotational axis 1.1, around which it can be driven in such a manner that it rotates. In order to tension it in a milling spindle chuck 2, the milling head 1 comprises a coupling part 1.2. A shoulder 1.5 is connected to the coupling part 1.2. Starting from the shoulder 1.5, a shaft 1.3 is provided on the end of which a blade collar 1.4 with an outer diameter D is provided. Starting from the blade collar 1.4 at the height of the maximum diameter D, the free length L including the shaft 1.3 and the shoulder 1.5 is approximately 60 mm. On the blade collar 1.4, two cutting plates 14a, 14b are sketched with the diameter 2R. On the side of the blade collar 1.4, a spectacle lens surface 3 to be machined is sketched, which can be machined by means of the blade collar 1.4 or the cutting plates 14a, 14b. The milling head 1 is held in the milling spindle chuck 2 by means of the coupling part 1.2. Here, by means of the shoulder 1.5, the milling head 1 rests in the axial direction of the rotational axis 1.1 against the milling spindle chuck 2.

According to the exemplary embodiment shown in FIG. 2, the blade collar 1.4 comprises several cutting plates 14a, 14b, 14c with a radius R. The blade collar 1.4 is directly connected to the shaft 1.3, wherein a transfer radius 1.3a is provided. In a corresponding manner, the shaft 1.3 is connected by means of a transfer radius 1.3b to the shoulder 1.5. The shoulder 1.5 also comprises a contact surface 1.5a, against which the milling spindle chuck 2 can be brought into contact in the axial direction of the rotational axis 1.1. The length L designates with reference to the direction of the rotational axis 1.1 the distance between the contact surface 1.5a and the blade collar 1.4 at the height of the maximum diameter D. The coupling part 1.2 is connected to the shoulder 1.5 and comprises different retaining and alignment means 1.2a, 1.2b, not shown.

Figure 2A:
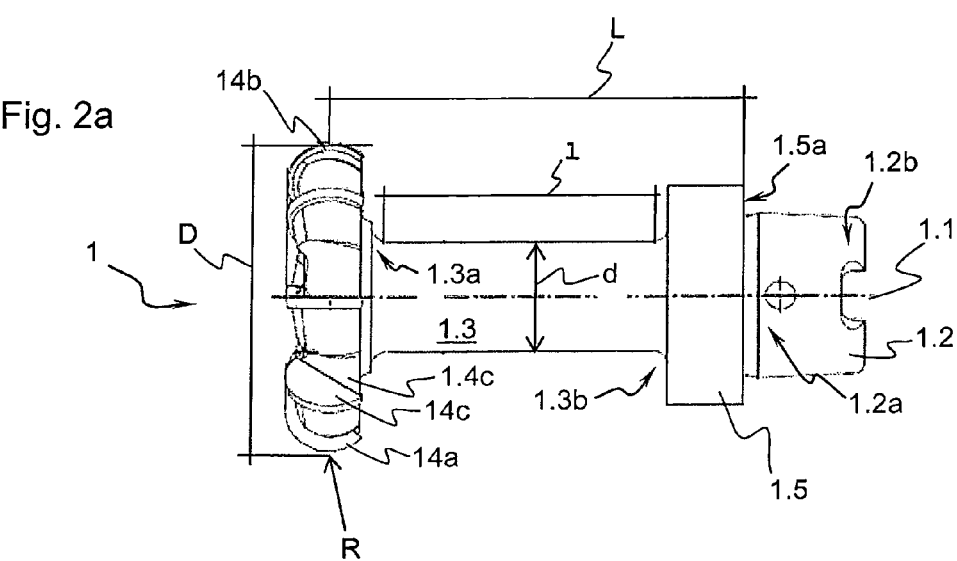
FIG. 2a shows a side view of the milling head.
Figure 2B:
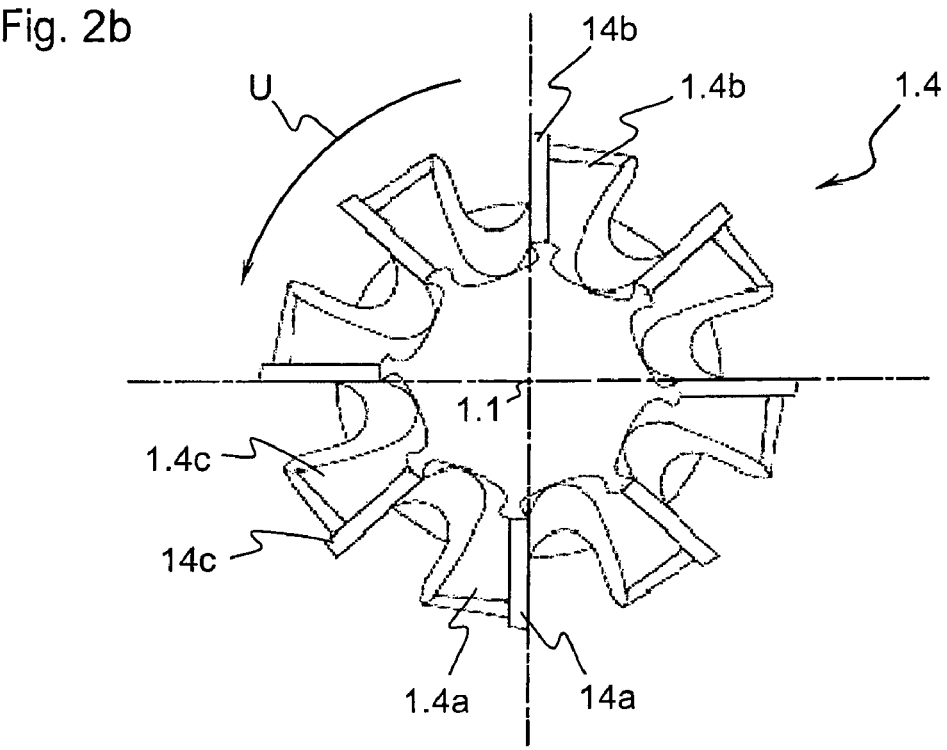
FIG. 2b shows a front view of the milling head.

According to the view from the front shown in FIG. 2b, the milling head 1 or the blade collar 1.4 comprises eight blades or cutting plates 14a, 14b, 14c, which are distributed over a circumference U. The cutting plates 14a, 14b, 14c are affixed to a corresponding finger 1.4a, 1.4b, 1.4c of the blade collar 1.4. Here, the respective cutting plate 14a, 14b, 14c comprises a semi-circular form with a size which correspond to approximately 50% to 80% of the surface of the respective finger 1.4c, as can be seen in FIG. 2a.

Figure 3:
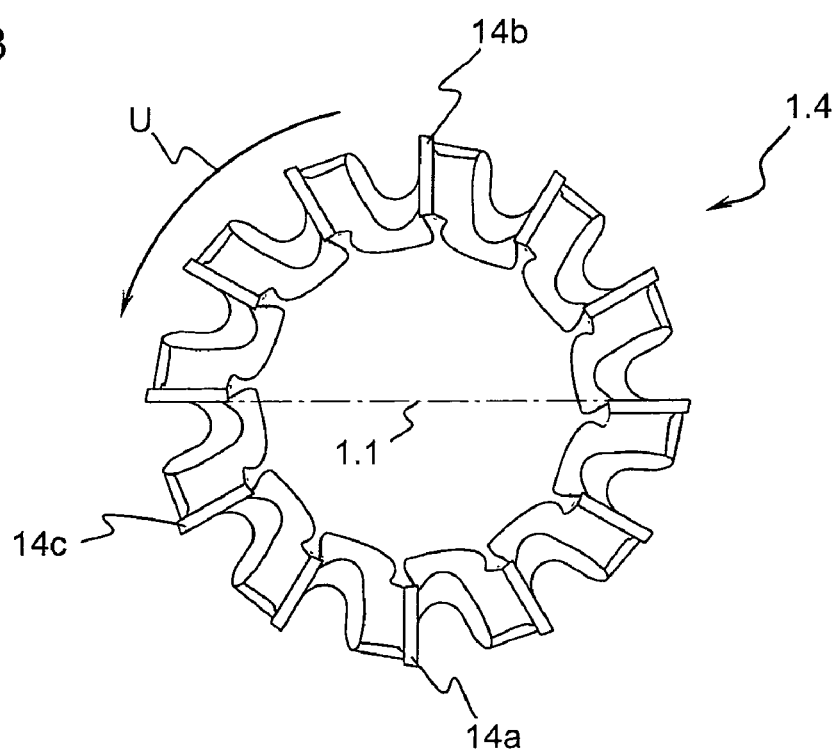
FIG. 3 shows a front view of a milling head

According to the exemplary embodiment shown in FIG. 3, the milling head 1 comprises twelve blades or cutting plates 14a, 14b, 14c, which are distributed over a circumference U.

LIST OF REFERENCE NUMERALS

1 Milling head
1.1 Rotational axis
1.2 Coupling part
1.2a Retaining and alignment means
1.2b Retaining and alignment means
1.3 Shaft
1.3a Transfer radius
1.3b Transfer radius
1.4 Blade collar
1.4a Finger
1.4a Finger
1.4b Finger
1.5 Shoulder
1.5a Contact surface
2 Milling spindle chuck
3 Spectacle lens surface
14a Cutting plate
14b Cutting plate
14c Cutting plate
d Diameter
D Outer diameter
l Length, shaft length
L Length
R Radius
U Circumference

What is claimed is:

1. A milling head for a milling machine for producing synthetic spectacle lenses, comprising a rotational axis, a coupling part for tensioning in a milling spindle chuck, a shoulder which is connected to the coupling part with a contact surface for the milling spindle chuck, a shaft which is connected to the shoulder and a blade collar with an outer diameter D which is connected to the shaft and which comprises several cutting plates with a radius R, wherein between the blade collar at the height of the outer diameter D and the contact surface, a free length L is provided,
   wherein the measurement of the free length L in relation to the measurement of the outer diameter D and the measurement of the radius R fulfills the following condition:

$$ILI = 0.18(IDI - 2IRI) + 54 \pm a,$$

with a maximum deviation a of 3; and wherein the shaft over a length l which corresponds at least 50% to the length L, comprises a diameter d between 10 mm and 32 mm.

2. The milling head according to claim 1, wherein the length l is between 80% and 120% of the outer diameter D.

3. The milling head according to claim 1, that wherein the blade collar comprises twelve cutting plates over its circumference U.

4. The milling head according to claim 1, wherein the shaft over a length l which corresponds at least 50% to the length L, comprises a diameter d of maximum 16 mm.

5. The milling head according to claim 1, wherein the shaft over a length l which corresponds at least 50% to the length L, comprises a diameter d with 26 mm.

6. The milling head according to claim 4, wherein the length l is between 80% and 120% or the length l is 100% of the outer diameter D.

7. The milling head according to claim 5, wherein the length l is between 80% and 120% or the length l is 100% of the outer diameter D.

8. The milling head according to claim 2, wherein the blade collar comprises twelve cutting plates over its circumference U.

9. The milling head according to claim 4, wherein the blade collar comprises twelve cutting plates over its circumference U.

10. The milling head according to claim 5, wherein the blade collar comprises twelve cutting plates over its circumference U.

11. The milling head according to claim 6, wherein the blade collar comprises twelve cutting plates over its circumference U.

12. The milling head according to claim 7, wherein the blade collar comprises twelve cutting plates over its circumference U.

13. The milling head according to claim 4, wherein the length l is 100% of the outer diameter D.

14. The milling head according to claim 5, wherein the length l is 100% of the outer diameter D.

15. A milling head for a milling machine for producing synthetic spectacle lenses, comprising a rotational axis, a coupling part for tensioning in a milling spindle chuck, a shoulder which is connected to the coupling part with a contact surface for the milling spindle chuck, a shaft which is connected to the shoulder and a blade collar with an outer diameter D which is connected to the shaft and which comprises several cutting plates with a radius R, wherein between the blade collar at the height of the outer diameter D and the contact surface, a free length L is provided,
   wherein the measurement of the free length L in relation to the measurement of the outer diameter D and the measurement of the radius R fulfills the following condition:

$$ILI = 0.18(IDI - 2IRI) + 54 \pm a,$$

with a maximum deviation a of 3; and
   wherein the milling head is operable with a rotational speed of approximately 25,000 rpm.

16. The milling head according to claim 15, wherein the shaft over a length l which corresponds at least 50% to the length L, comprises a diameter d between 10 mm and 32 mm.

17. The milling head according to claim 16, wherein the length l is between 80% and 120% of the outer diameter D.

18. The milling head according to 15, wherein the blade collar comprises twelve cutting plates over its circumference U.

19. The milling head according to claim 15, wherein the shaft over a length I which corresponds at least 50% to the length L, comprises a diameter d of maximum 16 mm.

20. The milling head according to claim 15, wherein the shaft over a length I which corresponds at least 50% to the length I, comprises a diameter d with 26 mm.

\* \* \* \* \*